United States Patent [19]

Leonhart

[11] Patent Number: 4,989,035
[45] Date of Patent: Jan. 29, 1991

[54] LATCH SYSTEM FOR VACUUM FRAME ASSEMBLY

[75] Inventor: Charles J. Leonhart, Schaumburg, Ill.

[73] Assignee: nuArc Company, Inc., Niles, Ill.

[21] Appl. No.: 369,334

[22] Filed: Jun. 21, 1989

[51] Int. Cl.⁵ ............................................. G03B 27/20
[52] U.S. Cl. ........................................ 355/93; 355/76
[58] Field of Search ...................... 355/93, 91, 92, 94, 355/75, 76

[56] References Cited

U.S. PATENT DOCUMENTS

| | | | |
|---|---|---|---|
| 1,151,477 | 8/1915 | Knudsen | 355/93 |
| 1,702,232 | 2/1929 | Koppe | 355/91 |
| 3,147,683 | 9/1964 | Hulen | 355/93 |
| 3,266,402 | 8/1966 | Benson | 355/93 |
| 3,463,587 | 8/1969 | Oltra et al. | 355/93 |
| 4,536,085 | 8/1985 | Hliboki et al. | 355/93 |

Primary Examiner—Monroe H. Hayes
Attorney, Agent, or Firm—Mason, Kolehmainen, Rathburn & Wyss

[57] ABSTRACT

A latch system for a vacuum frame has a plurality of separate latching mechanisms interconnected with a common actuator rod so that the glass frame can be unlatched and raised with one hand.

22 Claims, 6 Drawing Sheets

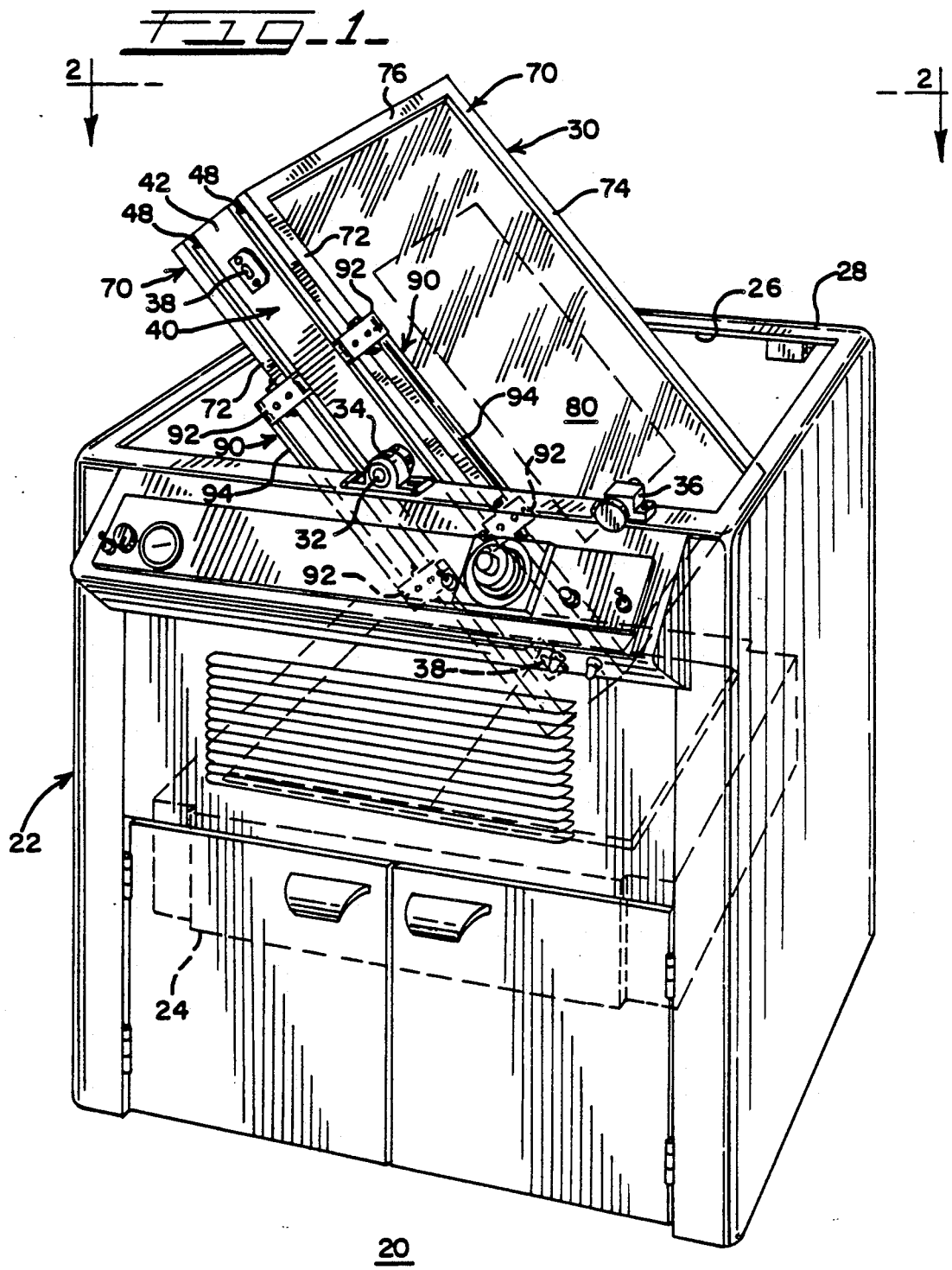

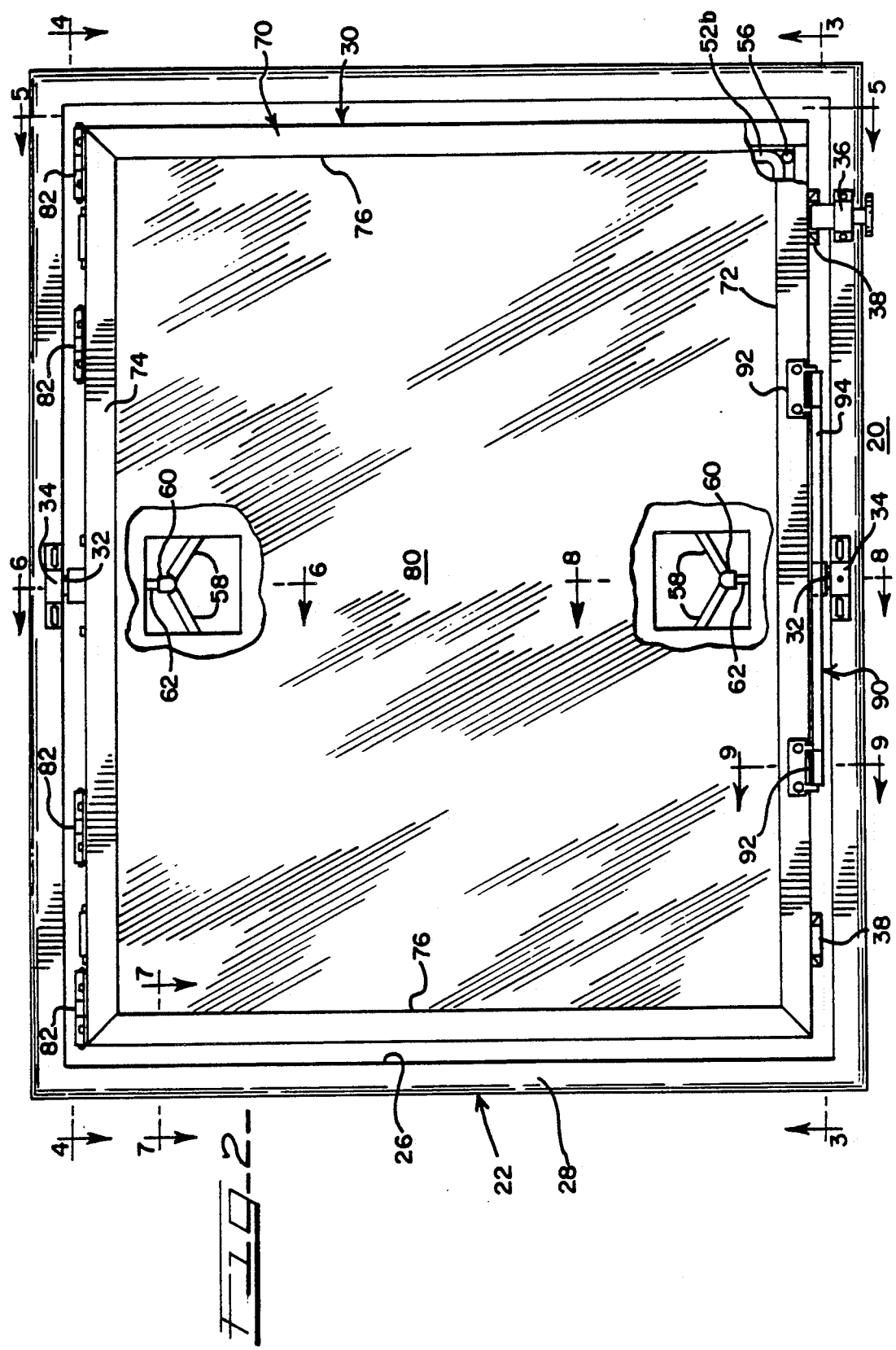

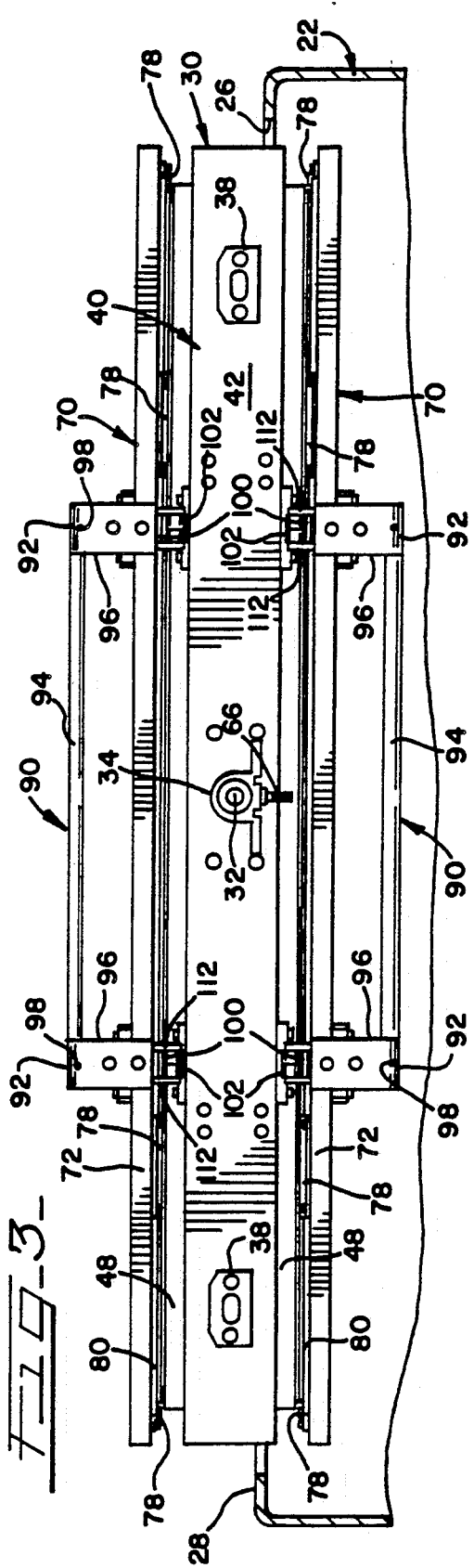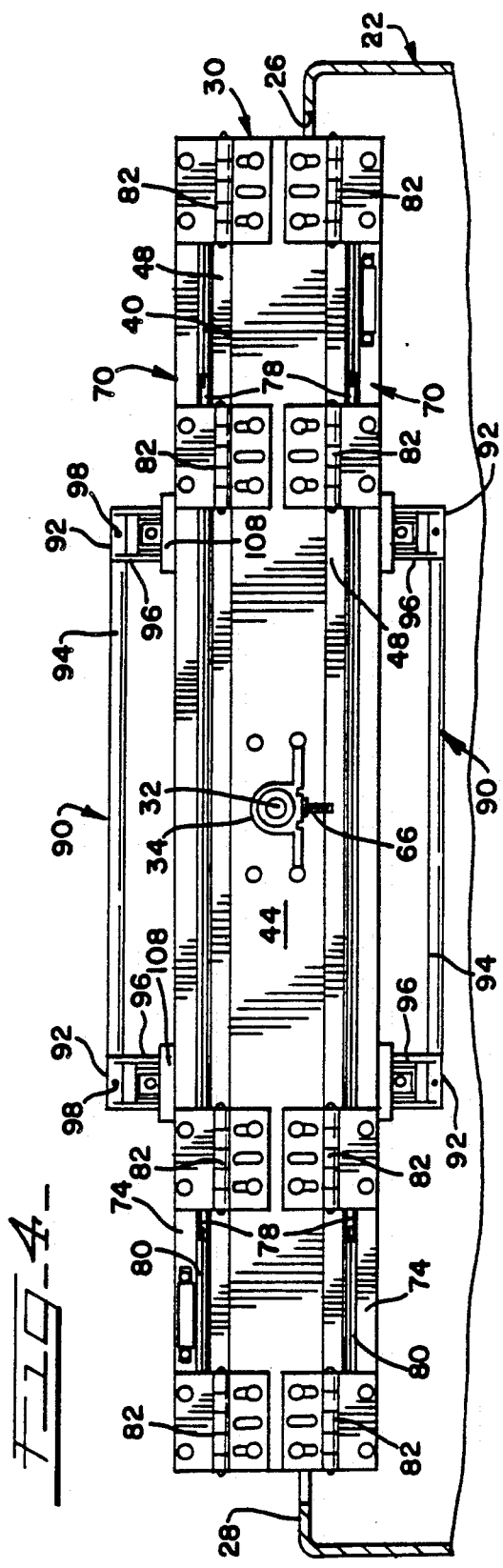

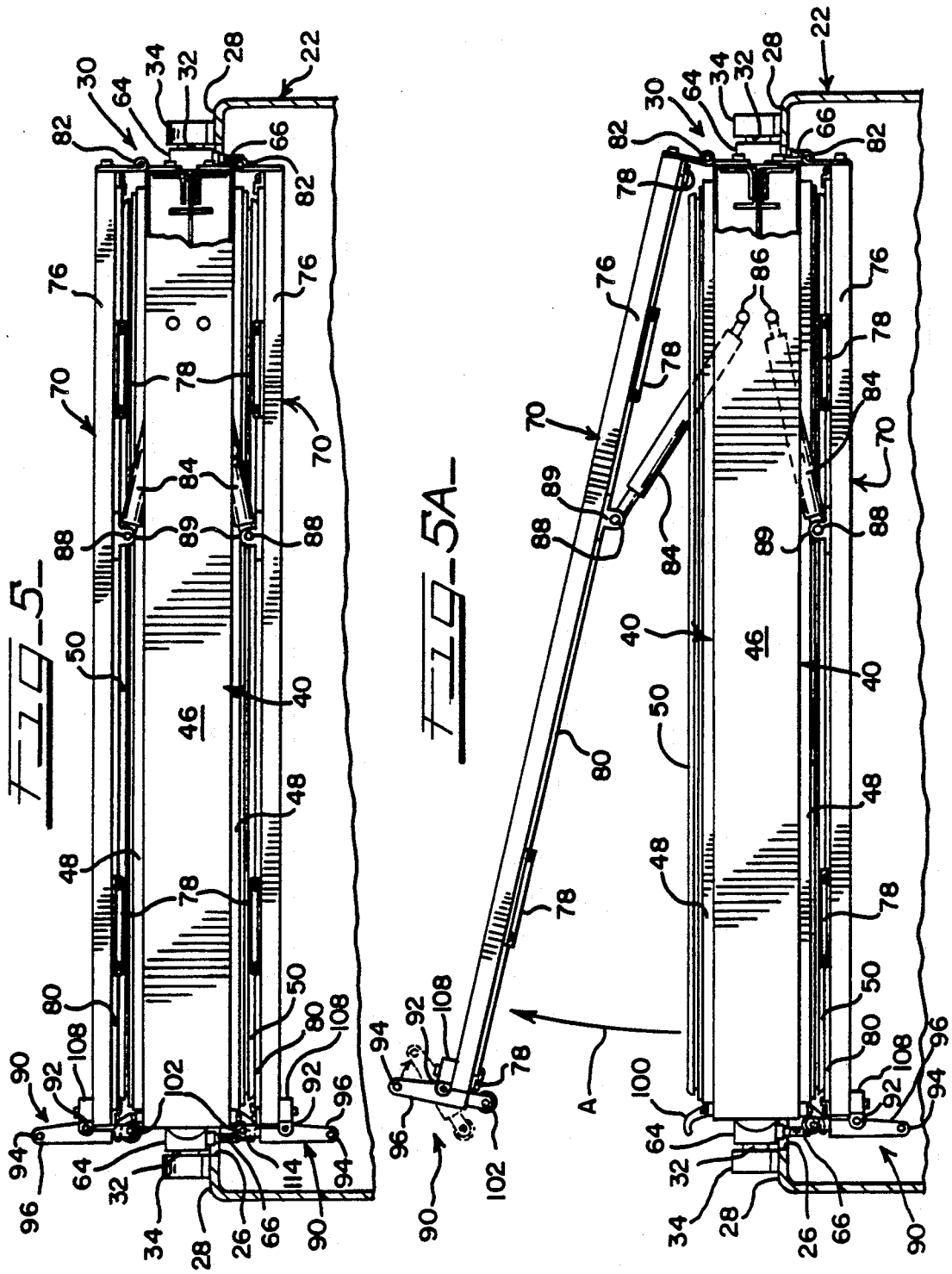

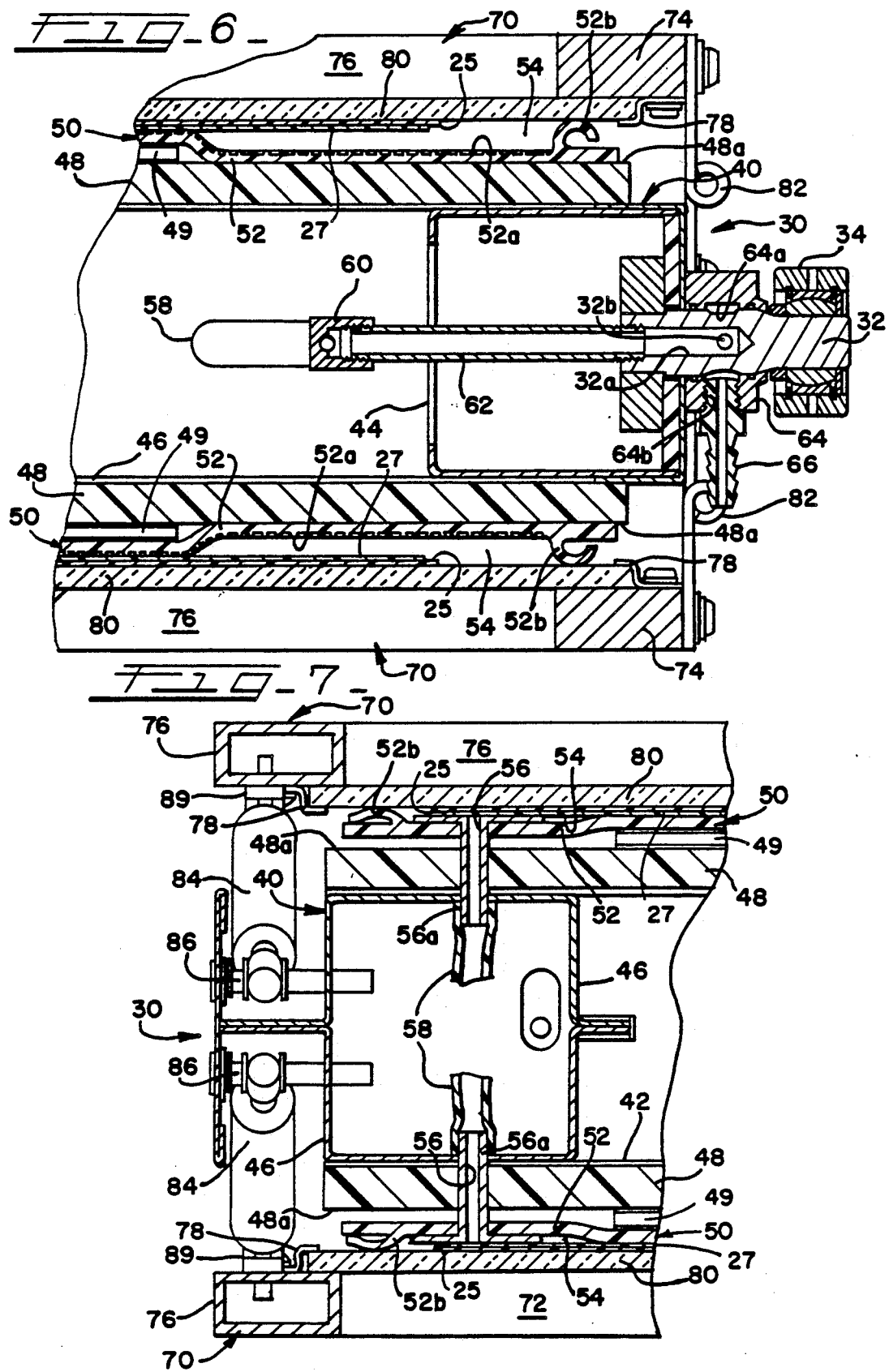

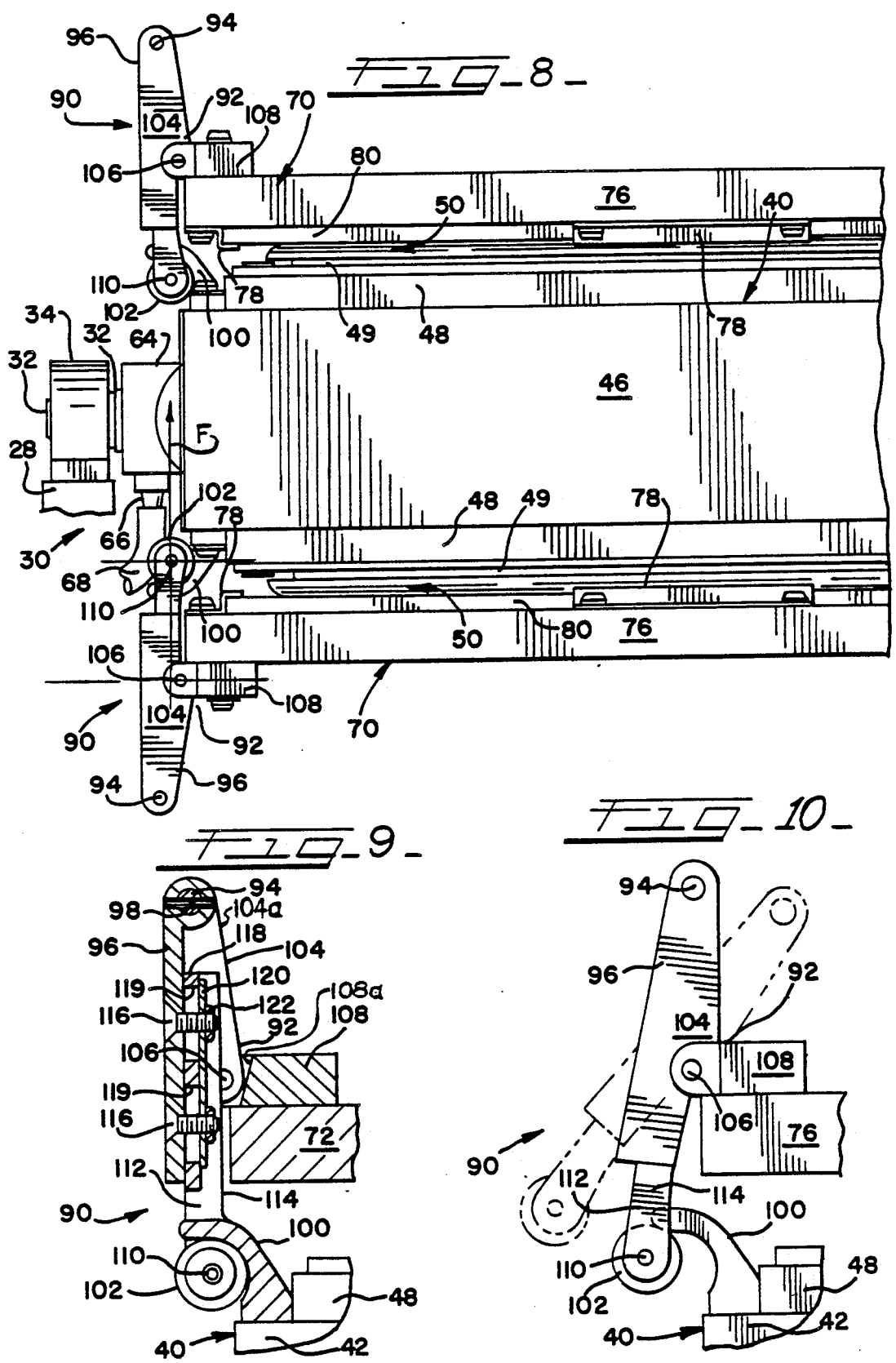

LATCH SYSTEM FOR VACUUM FRAME ASSEMBLY

BACKGROUND OF THE INVENTION

1. Field of the Invention

The present invention relates to a new and improved latch system for use with a vacuum frame assembly of the type including a rectangular-base supporting at least one glass frame hingedly attached thereto along one side for movement between a closed position and an open, angularly divergent position elevated from a working face of the base to accommodate sheets of film media used for making copy and plates in a plate maker and the like.

More particularly, a new and improved latch system of the present invention is especially adapted to provide a plurality of separate latching mechanisms interconnected with a common actuator rod or handle for latching and unlatching the glass frame and support base.

2. Description of the Prior Art

Vacuum frame assemblies have been used for obtaining precise registration between a film media master image sheet and a pre-sensitized image sheet while the sheets are sandwiched together between a vacuum blanket and a glass frame for controlled light exposure. A vacuum frame assembly is mounted on a support base which carries a vacuum blanket thereon to press the film sheets in close registration against the planar surface of a glass plate for copy making, printing, plate making, etc.

U.S. Pat. No. 3,738,742 discloses a photographic printer having a rectangular printing frame or base that is rotatably mounted in a cabinet containing a light source for movement between alternate positions for exposure of film media held in precise registration against a planar surface of the printing frame.

U.S. Pat. No. 4,028,166 discloses a system for laminating sheet material employing a rigid base structure and a hingedly attached rectangular frame with vacuum means for insuring accurate registration between media sheets placed thereon U.S. Pat. No. 3,627,416 discloses a contact printer employing twin frame structures for making photographic plates and the like.

Other photographic contact printers and the like are shown in U.S. Pat. Nos. 3,399,594 and 3,266,402.

OBJECTS OF THE INVENTION

It is an object of the present invention to provide a new and improved latching system for use with photographic plate and copy makers used in the graphic arts industry.

More particularly, it is an object of the present invention to provide a new and improved latch system for securely latching a glass frame assembly to a support base structure.

Another object of the present invention is to provide a new and improved frame latching system of the character described wherein a pair of operable latching mechanisms are controlled by a common element so that the hingedly attached, pivoting frame is securely latchably engaged with a supporting base structure.

BRIEF SUMMARY OF THE INVENTION

The foregoing and other objects and advantages of the present invention are accomplished in a new and improved latching system for use with a vacuum frame assembly of the type including a rectangular base supporting at least one glass frame having a side hingedly attached along one side of the base for movement between a closed position in parallel with the base and an angularly divergent, open position for providing access to insert and remove film media sheets used for plate making, copy making and the like. The latch system in accordance with the invention includes a plurality of separate, latch mechanisms spaced apart longitudinally along a side of the glass frame and base that is opposite the side of hinged attachment between the base and frame.

Each of the latch mechanisms includes a latching lever pivotally mounted on a support fixedly attached to the glass frame member and a latch strike plate of the latch mechanism fixedly attached to the base. A common actuator handle or rod extends between the spaced latch levers of the latch mechanisms to move the levers in unison for latchedly securing the glass frame and base together at a plurality of points along a side member of the frame.

BRIEF DESCRIPTION OF THE DRAWINGS

For a better understanding of the present invention, reference should be had to the following detailed description taken in conjunction with the drawings, in which:

FIG. 1 is a front perspective elevational view of a contact printer or plate maker employing a vacuum frame assembly and latch system in accordance with the features of the present invention;

FIG. 2 is a top plan view taken substantially along lines 2—2 in FIG. 1;

FIG. 3 is a fragmentary cross-sectional view taken substantially along lines 3—3 of FIG. 2;

FIG. 4 is a fragmentary cross-sectional view taken substantially along lines 4—4 of FIG. 2;

FIG. 5 is a fragmentary cross-sectional view taken substantially along lines 5—5 of FIG. 2;

FIG. 5A is a cross-sectional view similar to FIG. 5 but illustrating a glass frame pivoted upwardly from a rectangular base ready for loading and unloading film media between the two for plate making, copy making operations, etc.;

FIG. 6 is a fragmentary cross-sectional view taken substantially along lines 6—6 of FIG. 2;

FIG. 7 is a fragmentary cross-sectional view taken substantially along lines 7—7 of FIG. 2;

FIG. 8 is a fragmentary cross-sectional view taken substantially along lines 8—8 of FIG. 2;

FIG. 9 is a fragmentary cross-sectional view taken substantially along lines 9—9 of FIG. 2; and FIG. 10 is an elevational view similar to FIG. 9 but illustrating a latch mechanism in accordance with the present invention with several operative positions shown in phantom.

DETAILED DESCRIPTION OF A PREFERRED EMBODIMENT OF THE INVENTION

Referring now more particularly to the drawings, therein is illustrated a photographic contact printer 20 of the general type as shown in U.S. Pat. No. 3,738,748, which patent is incorporated herein by reference. The contact printer 20 includes an upstanding, generally rectangular-shaped cabinet 22 for containing a light source 24 and other components for directing and controlling an upwardly directed illuminating light beam aimed toward a large, rectangular-shaped opening 26 formed in a peripheral top wall 28 of the cabinet 22.

A vacuum frame assembly 30 in accordance with the present invention is pivotally supported for rotational movement between alternate horizontal positions on a pair of front and rear axles 32 journalled in pillow blocks 34 mounted on front and rear edges of the top wall 28 of the cabinet 22. As set forth in the aforementioned U.S. patent incorporated herein by reference, the vacuum frame assembly 30 is rotatable about the axles 32 between alternate horizontal positions so that first one and then the opposite side of the frame assembly may be exposed to the light source 24 contained within the cabinet 22 to provide a timed exposure of controlled light intensity for the film sheets on the vacuum frame assembly 30. For the purpose of supporting the vacuum frame assembly 30 in a precise horizontal alignment in the cabinet 22, the contact printer 20 includes a manually operated lock assembly 36 (FIGS. 1 and 2) adapted to releaseably lock and engage a pair of alternate strike plates 38 mounted on a forward edge of the vacuum frame assembly 30.

The vacuum frame assembly 30 includes a large rectangular frame or support base 40 having an elongated, hollow, tubular front side member 42, a parallel rear side member 44 and a pair of opposite, transverse, side frame members 46 interconnecting opposite ends of the front and rear side members to form a relatively rigid, strong, but lightweight integral rectangular hollow frame.

The frame 40 supports a pair of opposite, parallel, rectangular-shaped base sheets 48 formed of urethane foam board or the like, each having a substantially planar, smooth outer working surface or face 48a adapted to provide resilient backing for a vacuum blanket assembly 50, which preferably is of a type shown and described in copending United States patent application, Ser. No. 353,055, filed May 17, 1989. This application is assigned to the same assignee as the present application and is incorporated herein by reference. Referring briefly to FIGS. 6 and 7, each vacuum blanket 50 includes a blanket sheet 52 of thin, flexible resilient material having a plurality of indentations 52a on an outer face thereof and a flexible, peripheral sealing lip 52b of a generally rectangular outline adjacent and around the peripheral edges of the blanket.

In order to draw a vacuum on a space 54 defining a vacuum chamber within the border of the peripheral sealing lip 52b between the vacuum blanket and the glass frame, a vacuum port fitting 56 is mounted adjacent one or more corners of the vacuum blanket sheet 52. The fittings 56 include a stem 56a extending through openings provided in the base sheets or foam boards 48 and the supporting side frame members 46. Each stem 56a is connected to a flexible vacuum line 58, and the vacuum lines in turn are connected via a Y-fitting 60 to a rigid conduit member 62 (FIG. 6) in direct communication with a blind bore 32a provided in the adjacent supporting pivot axle 32 of the vacuum frame assembly 30.

The blind coaxial bore 32a of each pivot axle 32 is in communication via a plurality of radial passages 32b to an annular passage 64a of an annular collar 64 mounted on the axle 32. Each collar 64 includes a radial, threaded port 64b in communication with a threaded vacuum fitting 66, which fitting in turn is connected to a vacuum pump (not shown) through a flexible hose 68 (FIG. 8). Between each resilient foam board sheet 48 and an adjacent vacuum blanket 50 there is provided a particle board spacer sheet 49 approximately 5/16" thick. The particle board spacer sheets 49 are dimensioned to fit within the outline of the rectangular perimeter seal 52b of a respective blanket 52 and reduce the volume of the vacuum chambers or spaces 54 in order to speed up the operation of the vacuum blankets 30 when an operating vacuum pump is connected to the front and rear fittings 66 during an operational cycle as best shown in FIGS. 6 and 7.

In accordance with the present invention, the vacuum frame assembly 30 includes a pair of rectangular-shaped, glass supporting frames 70 of generally rectangular shape, mounted on opposite sides of the rectangular base or frame 40 in confronting relation with the respective base sheets 48 and their work surfaces 48a. Each glass frame 70 includes an elongated front side member 72, a parallel, rear side member 74 and a pair of opposite, transverse, side frame members 76 joined to opposite ends of the front and rear side frame members as best shown in FIGS. 1 and 2. Each elongated side frame member of each glass frame 70 is provided with a plurality of elongated clips 78 of Z-shaped transverse cross-section for securing a relatively stiff or rigid sheet of plate glass or transparent plastic material 80 to an inside face of a glass frame 70. When the glass frames 70 are closed in relation to the base 40, the glass plates 80 are adapted to confront in parallel relationship, the adjacent work surface 48a of a foam board sheet 48 on the frame 40 of the vacuum frame assembly 30. The Z-shaped clips 78 are longitudinally spaced apart around the entire periphery of each glass frame 70 and a plurality of clips are provided on each of the front, rear and side frame members 72, 74 and 76, so that the plate glass 80 is firmly secured in place and to provide strength for each glass frame structure as a whole.

Each glass frame 70 is pivotally secured to the support frame of the base 40 by a plurality of hinges 82 having opposed leaves secured to the rear frame member 74 of a glass frame 70 and the rear frame member 44. As illustrated in FIG. 5A, the hinges 82 for each glass frame 70 permit relative pivotal movement of the glass frame with respect to the support base frame 40 about a longitudinal pivot axis extending parallel to the rear frame members 44 and 74 so that the glass frame may pivot from a closed or parallel position (FIG. 5) upwardly to a sloped, elevated, open position as shown in FIG. 5A and indicated by the arrow "A". When a glass frame 70 is open, a large space or access area is provided for loading and unloading sheets of film media 25 and 27 (FIGS. 6 and 7) between the vacuum blanket 50 and the confronting surface of the glass plate 80 on the adjacent glass frame 70.

In order to support a glass frame 70 in an open, upwardly sloped position as shown in FIG. 5A, there is provided a pair of gas springs 84 having one end pivotally interconnected to side members 46 of the base frame 40 by pivot axles 86 and a forward or rod end pivotally interconnected to an adjacent side member 76 of the glass frame 70 by means of pivot pins 88 and clevises 89 which are secured to the frame members 76 as shown in FIGS. 5 and 5A.

In accordance with the present invention, a new and improved latching assembly 90 on the front side of the support base 40 is adapted for securing the respective upper and lower glass frames 70 to the base 40 at a plurality of spaced apart locations along the respective pairs of front side frame members 42 and 72 spaced opposite to the hingedly interconnected rear frame members 44 and 74 of the base 40 and glass frames 70, respectively. Each frame latching assembly 90 includes a pair of separate latch mechanisms 92 spaced apart longitudinally at approximate quarter points on the base frame 40 and a respective glass frame 70.

The individual latch mechanisms 92 on each of the respective glass frames 70 are interconnected by a common actuating rod or handle 94 extended parallel of the front side frame member 72 so as to provide easy operating access to an operator standing in front of the contact printer 20. As best shown in FIG. 9, the elongated actuator rod/handle 94 is pinned to the upper end portions of a pair of actuating levers 96 of the respective latch mechanisms 92 by means of cross pins 98. Each latch mechanism 92 includes a latch strike element 100 having a hook-shaped arm adapted to latchingly engage a roller 102 mounted at the lower end of a lever element 114.

When the latch mechanisms 92 are in a latched position as shown in FIG. 8, contact between each latch roller 102 and its respective strike 100 on the base frame 40 is maintained by the resiliency of the vacuum blankets 50, sealing lips 52b and foam boards 48 and by a force moment about pivot pins of the hinges 82 created by the gas springs 84. Positive latching is thus maintained on both the upper glass frame 70 in a non-exposing position and the lower glass frame 70 in a light exposing position.

Smoothness of opening and closing of the respective glass frames 70 relative to the base frame 40 when a latch assembly 90 is unlatched is insured by the rollers 102 of the latch mechanisms 92 and the compressibility or resiliency of the vacuum blankets 50 and the sealing lips 52b, the foam boards 48 and the counterbalancing forces on the glass frames 70 provided by the gas springs 84.

Each latch lever 96 has a channel-shaped transverse cross-section provided with a pair of side flanges 104 and each side flange 104 is supported for pivotal movement on a mounting pin 106 carried on a mounting bracket 108 secured to a front side frame member 72 of the glass frames 70. Each roller 102 is mounted on a support axle 110 extended between a pair of opposite side flanges 112 of a lower portion of a channel-shaped, adjustable lever element 114. The lower lever elements 114 are mounted in a recess on the inside of an upper latch lever 96 by a plurality of cap screws 116 as shown in FIGS. 9 and 10.

Positive safety latching of a lower glass frame 70 pivoted into the light exposure position is due to the force moment about the pivot axis of the hinges 82 created by the weights of the glass frame 70 itself, the associated vacuum blanket 50, the associated spacer sheet 49, the forces exerted by the gas springs 84, and the relationships between the point of contact of the rollers 102 and respective strikes 100 and the pivot pins 106 of the latch mechanisms 92. This moment creates a substantial force F (FIG. 8) at the point of contact between the rollers 102 and strikes 100 of the latch assembly 90 on the lower glass frame 70 and the force acts to establish a closing force moment for each of the latch mechanisms 92 about the pivot pins 106 for keeping the mechanisms from unlatching.

Referring specifically to FIG. 9, the lower end segment 114 on each latch lever 96 includes a central web 118 extending between the opposite side flanges 112 thereof and the web is provided with a plurality of vertical slots 119 for adjustably accommodating the cap screws 116. Each cap screw extends through an aperture provided in a flat element 120 and a cap nut 122 secures the cap screw in place. This arrangement provides for smooth latching and unlatching of each of the plurality of separate latch mechanisms 92 of each latch system 90 on a glass frame 70 by the operator actuation of a single, elongated rod or handle 94 for pivoting the latch mechanisms between alternate open and closed or latched positions as desired.

Referring to FIGS. 9 and 10, relative pivotal movement of the latch levers 96 between the latched and unlatched positions is limited by engagement of back edges 104a of the side flanges 104 against a sloped surface 108a of the mounting brackets 108 when the levers 96 are in the unlatched position (dotted line, FIG. 10).

The unique latch system 90 provides an easily operated system for rapidly latching and/or unlatching a pivotal glass frame 70 with respect to support base 40 so that excellent reproduction of film images and plates can be obtained in a fast and efficient manner. A single handle or rod 94 extended over a substantial distance along the front side of each glass frame 70 operates a plurality of separate and spaced apart individual latch mechanisms 92 in unison. The latch mechanisms are located at spaced apart quarter points along a front side of each glass frame 70 and the support base 40. A resilient sandwich action is provided between the base frame 40 and the plate glass or plastic panel 80 of each glass frame 70 by means of a vacuum blanket 50 so that film media sheets 25 and 27 are positively held while controlled exposure light passes through the glass panel 80. The resiliency of the foam board sheets 48 and vacuum blanket sealing lips 52b permit latching and unlatching to take place smoothly and easily during copy and plate making operations. The unitary actuating handle or rod 94 controlling a plurality of separate, spaced apart latch mechanisms 92 further insures that the latching system 90 of the vacuum frame assembly 30 is user friendly.

Many modifications and variations of the present invention are possible in light of the foregoing specification and thus, it is to be understood that within the scope of the appended claims, the invention may be practiced otherwise than as specifically described.

What is claimed and desired to be secured by Letters Patent of the United States is:

1. A latch and lift system for a vacuum frame assembly of the type including a rectangular base supporting at least one glass frame having one side hingedly attached along one side of the base for movement between a closed position, generally parallel of a working face of said base and liftable to an open position angularly divergent from said working face for providing access to a space between said frame and working face, said latch and lift system comprising:

a plurality of separate latch mechanisms spaced apart longitudinally along an opposite side of said base and an opposite side of said frame adjacent thereto when said frame is in said closed position;

each of said latch mechanisms including a latch lever pivotally mounted on a support fixedly attached to one of said opposite side of said base or frame for movement about a pivot axis parallel of one side, a latch strike fixedly attached to the other of said opposite sides of said frame or base, and latch means on said lever remote from said support for contact with said latch strike for securing said latch lever in a latched position with respect to said latch strike; and a latch actuator rod and lift handle extending parallel of said one of said opposite sides of said base or frame for interconnecting said levers of said plurality of latch mechanisms, said handle connected to said levers for movement about said pivot axes of said latch mechanism to move the same in unison in one direction for latchably securing said glass frame and said base together at a plurality of points along said one of said opposite sides and in an opposite direction for releasing said glass frame from said base in readiness to move to said other position when a lift force applied to said handle is exerted in another direction generally normal to said glass frame.

2. The latch system of claim 1, wherein:
said latch means includes a roller for engaging said latch strike to maintain said latch mechanisms in said latched position when said glass frame is in said closed position on said base.

3. The latch system of claim 1, wherein:
said latch levers are pivotable about a pivot axis intermediate opposite ends thereof, and wherein said rod is connected to an outer free end of said latch levers and said latch means are mounted adjacent an inner end portion of said latch levers for latching engagement with said latch strikes when said glass frame is in said closed position on said base.

4. The latch system of claim 1, wherein:
said latch supports are mounted on said glass frame and said latch strikes are mounted on said base.

5. The latch system of claim 1, including:
at least one resilient support sheet between said glass frame and said base for biasing film means placed between said glass frame and base toward said glass frame.

6. The latch system of claim 5, including:
vacuum blanket means between said resilient support sheet and said glass frame for establishing a vacuum chamber between said film means and said glass frame for biasing said film means toward said glass frame when said chamber is evacuated.

7. The latch system of claim 6, wherein:
said latch means on said latch levers has a hardness sufficient to establish compression of said resilient sheet when said glass frame is latched in a closed position on said base.

8. The latch system of claim 1, wherein:
said base includes a plurality of parallel and opposite working faces and a plurality of glass frames are hingedly mounted on said one side of said base for movement toward and away from said respective working faces;
a plurality of said latch mechanisms mounted on each of said glass frames on said opposite side of said frames and a plurality of said latch strikes mounted on said opposite side of said base; and
a plurality of said rods adjacent said frames on said opposite working faces of said base.

9. The latch system of claim 8, wherein:
said latch strikes are mounted on said opposite side of said base.

10. The latch system of claim 9, wherein:
said latch mechanisms are mounted at quarter points along said opposite sides of said glass frames and base.

11. A vacuum frame assembly for exposing pre-sensitized sheets to light passed through a glass frame and a film master sheet biased toward said glass frame, comprising:
a rectangular base having at least one pair of parallel side members and a working surface extended therebetween for supporting said sheets for exposure;
a rectangular glass frame including at least one pair of parallel side members and transparent panel having a working surface extended therebetween opposing said working surface of said base;
hinge means for pivotally interconnecting adjacent side members of said glass frame and base for movement of said glass frame between a closed position overlying said base and an open position sloping outwardly away from said working surface thereof;
latch means for holding said glass frame in said closed position adjacent said base at a plurality of locations along adjacent second side members of said glass frame and base opposite respective ones of said first mentioned side members of said glass frame and base;
said latch means including a plurality of separate latch mechanisms spaced apart longitudinally along said second side members of said base or frame;
each of said latch mechanisms including a latch lever pivotally mounted on a latch support fixedly attached to a second side member of said base or frame for movement about a pivot axis parallel of said second side member, a latch strike fixedly attached to a second side member of said frame or base, and latch means on said lever remote from said support for contact with said latch strike for securing said latch lever in a latched position when said frame is in said closed position on said base; and
a latch actuator and frame lifting handle for interconnecting said levers of said plurality of latch mechanisms to move in unison in one direction about said pivot axis for latchably securing said glass frame in said closed position and in an opposite direction about said pivot axis for unlatching said latch mechanisms to permit pivoting movement of said frame away from said base from said closed position toward said open position upon a lifting force being applied to said handle in a third direction generally normal to said base.

12. The vacuum frame assembly of claim 11, wherein:
said latch means includes a roller having an outer surface for engaging said latch strike to maintain said latch mechanisms in said latched position when said glass frame is in said closed position on said base.

13. The vacuum frame assembly of claim 11, wherein:
said latch levers are pivotable about a pivot axis intermediate opposite ends thereof, and wherein said handle is connected to an outer free and of said latch levers and said latch means are mounted adjacent an inner end portion of said latch levers for latching engagement with said latch strikes when said glass frame is in said closed position on said base.

14. The vacuum frame assembly of claim 11, wherein:
said latch supports are mounted on said glass frame and said latch strikes are mounted on said base.

15. The vacuum frame assembly of claim 11, including:
   at least one resilient support sheet between said glass frame and said base for biasing said sheets placed between said glass frame and said base toward said glass frame.

16. The vacuum frame assembly of claim 15, including:
   vacuum blanket means between said resilient support sheet and said glass frame for establishing a vacuum chamber between said sheets and said glass frame for biasing said sheets toward said glass frame when said chamber is evacuated.

17. The vacuum frame assembly of claim 16, wherein:
   said latch means on said latch levers has a hardness sufficient to establish compression of said resilient sheet when said glass frame is latched in a closed position on said base.

18. The vacuum frame assembly of claim 11, wherein:
   said base includes a plurality of said working surfaces parallel and opposite each other and a plurality of glass frames are supported by said hinge means for movement toward and away from said respective working surfaces;
   a plurality of said latch mechanisms mounted on each of said glass frames on said second side members of said frames and a plurality of said latch strikes mounted on said second side members of said base; and
   a plurality of said handles adjacent said frames mounted adjacent respective ones of said opposite working faces of said base.

19. The vacuum frame system of claim 18, wherein:
   said latch mechanisms are mounted at quarter points along said second side member of said glass frames and said base.

20. The vacuum frame system of claim 18, including in combination therewith:
   support means for holding said vacuum frame system in alternate horizontal positions wherein first one and then the other of said working surfaces is facing a light source.

21. The combination of claim 20, wherein:
   said support means includes means for mounting a light source to shine on said vacuum frame system in said alternate horizontal positions; and
   pivot means for rotatively supporting said vacuum frame system to move between said alternate horizontal positions.

22. The combination of claim 21, wherein:
   said support means includes retractable holding means remote from said pivot means for locking said vacuum frame system in said alternate positions.

* * * * *